Dec. 23, 1969  W. J. EICH  3,485,717

CONTROL ELEMENT

Filed Aug. 29, 1967

WITNESSES:
Helen M. Barbas
M. B. L. Hoppe

INVENTOR
Walter J. Eich
BY
ATTORNEY

United States Patent Office 3,485,717
Patented Dec. 23, 1969

3,485,717
CONTROL ELEMENT
Walter J. Eich, Pittsburgh, Pa., assignor to Westinghouse Electric Corporation, Pittsburgh, Pa., a corporation of Pennsylvania
Filed Aug. 29, 1967, Ser. No. 664,175
Int. Cl. G21c 5/00, 7/00
U.S. Cl. 176—86          8 Claims

ABSTRACT OF THE DISCLOSURE

A tube type control element suitable for either cluster or cruciform arrays is disclosed which has commingled and alternating tubes of control material or neutron absorbers presenting different cross-sectional absorption properties to the energy spectrum of neutrons such as the combination of silver-indium-cadmium and europium oxide. These absorbers produce a high worth control element which is strongly resonant in different energy ranges, and thus obviates the redundancy characteristics of uniform tube arrays.

BACKGROUND OF THE INVENTION

This invention pertains to nuclear reactors, and more particularly to the neutron absorbing control elements therefor.

Prior art control elements were generally composed of either hafnium, silver-indium-cadmium, or boron carbide. These control rods often comprised cladding tubes containing the neutron absorbing material arranged in a cuciform array, or took the form of a cluster of such tubes.

It is now known that the above prior art arrangements have a high percentage of tubes which are largely redundant. For example, experiments have shown that a 25 tube cruciform control rod has a neutron absorption worth of 85% of a similar 49 tube array. This was originally thought to be due to additional thermalization in the 25 tube cruciform. However, latter experimentation has shown that the absolute worth of a single rod is less in a square water hole than when closely packed with fuel, and that its worth decreases as the size of the square water hole is increased. These experiments would indicate that the 25 tube element is worth almost as much as its 49 tube counterpart in spite of rather than because of increased moderation of the neutron flux. Moreover, thermal capture only accounts for 20% of the total number of captures.

Present knowledge would indicate that the small difference (16% reduction in captures of 25 tube cruciform) is due to the fact that the 24 additional tubes in the 49 tube cruciform were largely geometrically shielded. In other words to be more general, that the additional 16 tubes possessed low statistical absorption weight because of ambient depletion in the resonance energy flux.

The problem then with prior art arrangements was simply that many of the tubes of the prior art arrangements were not receiving a sufficient number of neutrons in their capture range to utilize their full potential.

SUMMARY OF THE INVENTION

This invention solves the indicated problem of prior art control rods by utilizing tubes filled with absorbants which are strongly resonant in as different energy ranges as possible.

In one example of the invention, one set of tubes is preferably filled with silver-indium-cadmium, and a second set is filled with europium. These tubes are commingled preferably in an alternating pattern to be of maximum effectiveness. The pattern may be of a cruciform or cluster array.

The second set of tubes may contain europium in an oxide form. Although europium oxide is more expensive than the same volume of silver-indium-cadmium, the reductions in weight, cost of fabrication, and tubes per array, as well as the increased core and control rod lifetime more than compensate for the additional cost.

DESCRIPTION OF THE DRAWINGS

For a better understanding of the invention, reference may be had to the accompanying drawings, in which.

Figure 1:
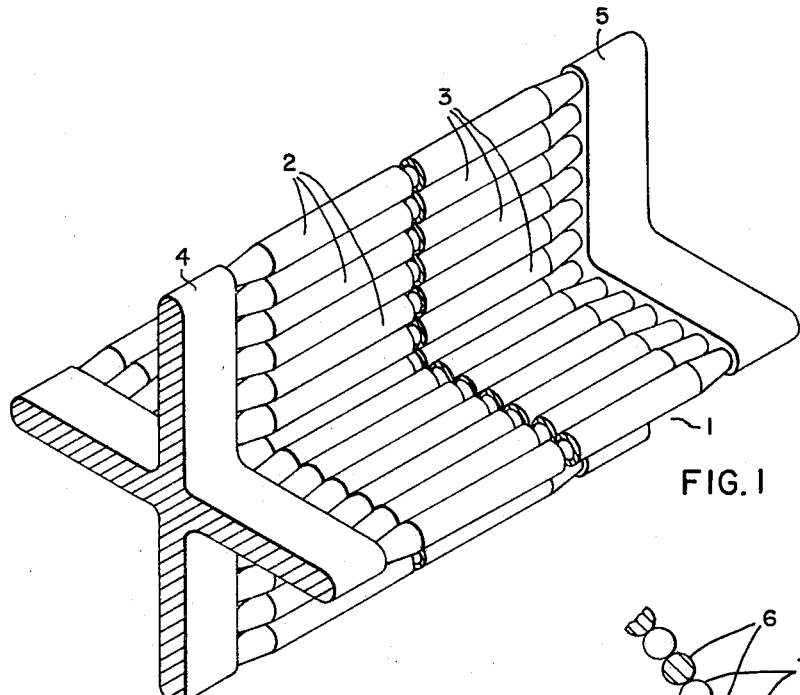
FIGURE 1 is an isometric view of a cruciform control element of the invention.

The worth of an absorber element or material is primarily dependent upon its absorption characteristics or capture cross-section and the number of capturable particles which are seen by it.

The first criteria will be discussed in terms of capture cross-section (measured in barns). The capture cross-section varies with the energy of the incoming particles and generally peaks in one or more energy ranges. As may be noted from the numerous graphical representations of capture cross-section versus energy, the various absorber materials have substantially different capture cross-sections for different energy ranges. In particular silver-indium-cadmium, boron carbide, and europium have peaks or capture resonances at different energies. In other words, neutrons at an energy such that the capture cross-sections of either silver-indium-cadmium or boron carbide are low, and such that the statistical probability of capture by these absorbers is small, might be captured by the europium.

The other criteria has reference to the position of an absorber tube with respect to its surrounding absorber tubes. A particular tube of absorber material may be geometrically shielded so that most of the neutrons in its high capture cross-section range have been captured by the absorbers in other tubes located closer to the source of neutrons. For example, indium is most likely to capture neutrons having an energy of 1.5 electron volts, that is to say, indium has a capture cross-section in excess of 10,000 barns with respect to neutrons of 1.5 electron volts. However, if these neutrons have been captured by rods closer to their source, the indium in a subsequent control tube located more remotely from the neutron source is far less likely to capture the remaining neutrons and is therefore largely redundant. For this reason, in this example, a material of higher or lower energy range high capture cross-section would be far more effective in the aforementioned subsequent control tube.

A particularly effective combination has been found to exist with respect to commingled and alternating tubes of silver-indium-cadmium and tubes of europium oxide and the particular embodiments of this invention will be discussed with respect to these absorbers. It should be understood, however, that the principles of this invention apply to a choice of any two or more absorbers which are commingled in an alternating fashion and which have different resonance characteristics or different energy ranges in which their capture cross-section is particularly large.

A numerical example will now be given using estimated numbers to point out the advantages of this invention. Suppose that in a cruciform configuration .84 neutrons would be captured by a 25 rod cruciform relative to the 49 rod array. Of the captured neutrons, approximately .60 are captured epithermally and .40 are captured thermally. Increasing the complement to 49 rods all of one type would result in .82 epithermal captured and .18 thermal captures. The .60 value is divided amoung the 25 tubes while the .20 value is divided among 49 tubes. On the other hand, using the europium in the 24 additional tubes would likely produce relative epithermal capture of 1.1, or 1.05 at least, and about the same thermal capture of .18. The 1.1 would probably split up as .5 in the 25 silver-indium-cadmium tube and .6 in the 24 europium tubes. These figures allow conservatively for the fact that some of the europium and some of the silver-indium-cadmium resonance are located at the same energies, i.e., the europium is assumed to have no more epithermal worth than the silver alloy and also it is assumed that 5/8 of the resonances of the two different materials are to be located in the same energy ranges. This accounts for the figure of 1.1 epithermal captures, that is, $5/8 + 3/8 + 3/8 \times .82$ has yielded approximately 1.1 epithermal captures.

Figure 2:
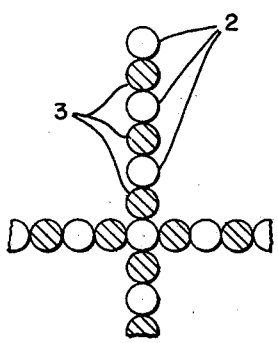
FIG. 2 is a schematic cross-section of FIG. 1.

The cruciform control element illustrated in FIGS. 1 and 2 comprises a plurality of tubes containing absorber material. The individual tubes comprise cylindrical sheaths of small cross-section constructed from a high temperature corrosion resistant material such as stainless steel or a zirconium alloy. The tubes are filled with a neutron absorbent material in any suitable form and end caps are welded on both of its ends. The control elements consist of two sets, 2 and 3, of commingled and alternating tubes of different absorber materials. For example, tube set 2 may contain silver-indium-cadmium while tube 3 may contain europium oxide. The tube sets are held together by straps (not shown) and by a bottom guide plate 4 and a top mechanism adapter plate 5.

The cross-sectional view of FIG. 2 indicates by hatching those tubes of tube set 3 which contain europium oxide and which may be seen to be commingled and alternated with tube set 2 which contains silver-indium-cadmium.

Figure 3:
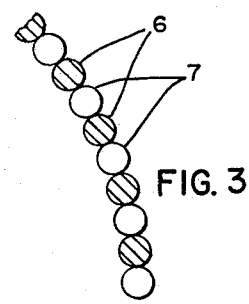
FIG. 3 is a schematic cross-section of another embodiment of the invention.

FIG. 3 illustrates another possible arrangement of the tube sets to form a single ring cluster control element. Here it can be seen that the tube set 6 containing europium oxide is commingled and alternated along a circular path with tube set 7 contatining silver-indium-cadmium. These tubes would be joined by top and bottom plates and affixed to a mechanism as in the configuration of FIGS. 1 and 2.

Figure 4:
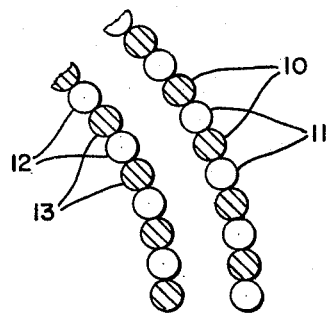
FIG. 4 is similar to FIG. 3 but shows a multi-ring cluster.

The configuration of FIG. 4 is in all respects similar to that of FIG. 3 with the exception that a two ring cluster is used. Here tube sets 10 and 11 of the outer ring and tube sets 12 and 13 of the inner ring are duplicates of the arrangement of FIG. 3. These sets may be course contain additional rings as may be necessitated by the physics of a particular reactor system.

It will therefore be apparent that there has been disclosed an alternating control element which because of its multi-range resonance characteristics is more efficient and lacks the redundant control units of prior art systems. While there have been shown and described what are, at present, considered to be the preferred embodiments of the invention, modifications thereto will readily occur to those skilled in the art. In particular the inventive concept is deemed applicable to any control rod system, as for example, a rod cluster type control rod. It is not desired therefore that the invention be limited to the specific arrangements shown and described and it is intended to cover in the appended claims all such modifications as fall within the spirit and the scope of the invention.

I claim as my invention:

1. A nuclear reactor control element comprising at least two discrete sets of neutron absorbing rod-like elements, each of said neutron absorbing rod-like elements including a material having a large neutron capture cross-section relative to at least one neutron energy range, which neither undergoes fission, nor transmutation to a material which undergoes fission, said material being included in sufficient quantity to be nearly as effective in capturing neutrons within its large neutron capture energy ranges at the end of the life of the fissionable material with which it is associated during a fuel cycle as at the beginning of the life of the fissionable material, one of said sets including a neutron absorbing material having at least one of its large capture cross-sections in a different energy range than the material of the other of said sets, means for fixedly positioning said rod-like elements of one set commingled with and adjacent the rod-like elements of the other set in an alternating and non-geometrically shielded array, whereby the statistical absorption weight of each set is not materially reduced due to ambient depletion by adjoining sets of the same neutron capture characteristics.

2. The nuclear reactor control element of claim 1 wherein the rod-like elements of each set have their longitudinal axes aligned and are commingled, alternated, and non-geometrically shielded in the radial direction.

3. The nuclear reactor control element of claim 2 wherein the rod-like elements of each set include a plurality of corrosion resistant tube-like elements containing said neutron absorbing materials.

4. The nuclear reactor control element of claim 3 wherein the said tube-like elements of one of said sets contains silver-indium-cadmium and the tube-like elements of another of said sets contains europium.

5. The nuclear reactor of claim 4 wherein the said europium is contained in the form of europium oxide.

6. The nuclear reactor of claim 5 wherein said plurality of tube-like elements are arranged in a cruciform array.

7. The nuclear reactor of claim 5 wherein said plurality of tube-like elements are arranged as a single ring cluster.

8. The nuclear reactor of claim 5 wherein said plurality of tube-like elements are arranged as a multi-ring cluster.

References Cited

UNITED STATES PATENTS

| | | | |
|---|---|---|---|
| 2,952,600 | 9/1960 | Newson | 176—86 |
| 3,049,484 | 8/1962 | Zinn. | |
| 3,141,227 | 7/1964 | Klepfer et al. | 176—86 |
| 3,175,955 | 3/1965 | Cheverton | 176—86 |
| 3,198,856 | 8/1965 | Hammond et al. | |
| 3,334,019 | 8/1967 | Bogaardt et al. | |

FOREIGN PATENTS

| | | |
|---|---|---|
| 1,056,950 | 2/1967 | Great Britain. |
| 889,702 | 2/1962 | Great Britain. |
| 1,151,608 | 7/1963 | Germany. |

BENJAMIN R. PADGETT, Primary Examiner

H. E. BEHREND, Assistant Examiner